(12) United States Patent
Kisla et al.

(10) Patent No.: US 11,578,762 B2
(45) Date of Patent: Feb. 14, 2023

(54) JOURNAL CROSS AND UNIVERSAL JOINT COMPRISING THE SAME

(71) Applicant: Off-Highway Powertrain Services Germany GmbH, Lohmar (DE)

(72) Inventors: Timur Mehmet Kisla, Troisdorf (DE); Max Krüger, Lohmar (DE)

(73) Assignee: Off-Highway Powertrain Services Germany GmbH, Lohmar (DE)

(*) Notice: Subject to any disclaimer, the term of this patent is extended or adjusted under 35 U.S.C. 154(b) by 366 days.

(21) Appl. No.: 16/788,614

(22) Filed: Feb. 12, 2020

(65) Prior Publication Data

US 2020/0263738 A1  Aug. 20, 2020

(30) Foreign Application Priority Data

Feb. 15, 2019 (DE) .......................... 102019202048.8

(51) Int. Cl.
*F16D 3/40* (2006.01)

(52) U.S. Cl.
CPC ............ *F16D 3/40* (2013.01); *F16D 2300/06* (2013.01); *F16D 2300/18* (2013.01)

(58) Field of Classification Search
CPC ..... F16D 3/40; F16D 2300/06; F16D 2300/18
USPC .................................................. 464/14, 23
See application file for complete search history.

(56) References Cited

U.S. PATENT DOCUMENTS

| | | | |
|---|---|---|---|
| 2,347,208 A | 4/1944 | Martin | |
| 2,724,965 A | 12/1952 | Crater et al. | |
| 3,545,265 A | 12/1970 | McIlraith et al. | |
| 3,956,930 A | 5/1976 | Shoberg | |
| 4,838,077 A | 6/1989 | Shifflet et al. | |
| 5,224,563 A | 7/1993 | Iizuka et al. | |
| 5,718,633 A | 2/1998 | Gehrke | |
| 6,670,890 B2* | 12/2003 | Kyrtsos ................. | G08C 17/02 |
| 6,813,973 B1 | 11/2004 | Perry | |
| 7,513,159 B2 | 4/2009 | Komeyama et al. | |
| 8,166,810 B2 | 5/2012 | Chen et al. | |
| 9,132,838 B2* | 9/2015 | Baker ....................... | F16D 3/41 |
| 9,667,116 B2 | 5/2017 | Fujimoto et al. | |
| 10,288,124 B2 | 5/2019 | Munk | |
| 2001/0033234 A1 | 10/2001 | Kyrtsos et al. | |
| 2008/0078253 A1 | 4/2008 | Blackwood et al. | |
| 2010/0151949 A1 | 6/2010 | Creek et al. | |
| 2011/0150654 A1 | 6/2011 | Wei et al. | |
| 2014/0062423 A1 | 3/2014 | Delhsen et al. | |

(Continued)

FOREIGN PATENT DOCUMENTS

| | | |
|---|---|---|
| CN | 203257535 U | 10/2013 |
| CN | 104769818 A | 7/2015 |

(Continued)

OTHER PUBLICATIONS

Universal Joint and Driveshaft Design Manual, AE-7, Society of Automotive Engineers, Inc., Section 3.1.1., Warrendale, PA, pp. 39-75, TJ1079.S62. (Year: 1979).*

*Primary Examiner* — Greg Binda
(74) *Attorney, Agent, or Firm* — The Webb Law Firm

(57) ABSTRACT

A space-saving method for early determination of wear of a universal joint with four journals projecting from a base is provided and relates to the field of drive technology. The journal cross of the universal joint is provided with a temperature sensor for the purpose of determining wear of the universal joint.

6 Claims, 1 Drawing Sheet

(56) References Cited

U.S. PATENT DOCUMENTS

| | | | |
|---|---|---|---|
| 2014/0188353 A1 | 7/2014 | Baker | |
| 2020/0018667 A1* | 1/2020 | Hansen | G01D 21/02 |
| 2020/0263738 A1 | 8/2020 | Kisla et al. | |
| 2022/0012960 A1* | 1/2022 | Muttige | G07C 5/0808 |

FOREIGN PATENT DOCUMENTS

| | | | |
|---|---|---|---|
| CN | 106050957 A | 10/2016 | |
| DE | 1675809 B1 | 10/1969 | |
| DE | 10160760 A1 | 6/2003 | |
| DE | 102013212052 A1 | 1/2015 | |
| EP | 0338095 A1 | 10/1989 | |
| EP | 1775492 A1 | 4/2007 | |
| EP | 2175547 A2 | 4/2010 | |
| EP | 2843359 A1 | 3/2015 | |
| EP | 3599389 A1 | 1/2020 | |
| WO | 9628665 A1 | 9/1996 | |
| WO | 2008138369 A1 | 11/2008 | |
| WO | 2014156674 A1 | 10/2014 | |

\* cited by examiner

JOURNAL CROSS AND UNIVERSAL JOINT COMPRISING THE SAME

CROSS-REFERENCE TO RELATED APPLICATION

This application claims priority to German Patent Application No. 102019202048.8 filed Feb. 15, 2019, the disclosure of which is hereby incorporated by reference in its entirety.

BACKGROUND OF THE INVENTION

The present invention lies in the field of drive technology.

Drive shafts are used to transmit torque in a kinked shaft train. Occasionally, these drive shafts are equipped with an additional length compensation which is also referred to as a slider.

Said drive shafts, which are to be improved with the present invention, are also used between tractors and agricultural machines towed, pushed or carried by them. Between the tractor and the driven machine, a drive shaft with two universal joints and an intermediate, multi-part shaft, which realizes a shaft tube as well as segments for length compensation, is normally used in order to allow torque transmission to be independent of the type of movement performed by the working machines relative to the tractor or towing vehicle.

The present invention is particularly concerned with the improvement of such drive shafts.

In operation, the aim is to detect imminent wear or other technical problems of the universal joint at an early stage. So far, there has been no lack of proposals in this respect. EP 1 775 492 B1 suggests that a lack of coaxiality between the central longitudinal axis of the journal and a rolling bearing associated with the journal should be taken as an indication of imminent wear. For this purpose, an ultrasonic sensor is assigned to each journal which monitors the radial gap dimension between the outer circumferential surface of the journal and an ultrasonic sensor projecting into a journal bore, which is fixedly mounted on an end cap that is to have a fixedly predetermined spatial relationship to the rolling bearing. A corresponding proposal is also presented by EP 2 843 359 B1.

SUMMARY OF THE INVENTION

The present invention aims to provide a reliable and compact possibility of determining imminent wear on a journal joint.

In order to solve this problem, the present invention suggests a journal cross with the features described in detail herein. According to the invention, this journal cross has at least one temperature sensor attached to the journal cross.

According to the present invention, the temperature sensor directly measures the temperature of the journal cross. The temperature sensor usually records the current temperature of the material forming the journal cross or of a lubricant (usually grease) contained in the base of the journal cross.

An increase in temperature in the area of the journal cross is interpreted as an indication of imminent wear. Bearings subject to wear usually have increased coefficients of friction. Moreover, misalignments of individual components of the journal cross moving relative to each other can lead to increased power dissipation in the journal cross, which increases the temperature. Such temperature increases are taken as an indication of imminent wear of the journal cross.

Preferably the temperature sensor is mounted to the base. Accordingly, it measures the temperature of the material forming the base or the lubricant absorbed in the base. The position of the temperature measurement thereby should be as far away as possible from the center of the base. Preferably, the temperature sensor extends into one of the journals. This is where the frictional heat of the bearing is generated. An increased temperature regularly occurs there if the bearing of the journals is not set to friction-optimized and/or if an increased power loss occurs for other reasons, for example due to a misalignment in the drive shaft.

According to a preferred further configuration of the present invention, the temperature sensor comprises several sensor elements. One of the sensor elements is preferably assigned to each journal of the journal cross. Accordingly, each journal of the journal cross is monitored with regard to its current temperature by a corresponding sensor element. Thus, wear can be detected early in each of the bearings assigned to the journals.

Preferably, a sensor element is arranged in a lubricant channel that is recessed in the journal cross and assigned to the journal. Alternatively, the sensor element is arranged on the outer circumference of a journal. In both configurations, the sensor element is assigned to one of the journals, respectively. The arrangement in the lubricant channel can be made near the axial end of the journal. In any case, the arrangement is usually such that the sensor is circumferentially surrounded by a journal receptacle or another point of application of force to the journal cross. In the alternative configuration in which the sensor element is located at the outer circumference of the journal, the sensor element is in any case located outside a center point where the axes of the individual journals intersect. The sensor element is usually also located outside the base which is towered over by the journals. In this case, the sensor element is located as close as possible to the point which circumferentially surrounds and/or clamps the free end of the journal for force transmission.

The individual sensor elements are preferably each connected individually to a common logic for processing signals from the temperature sensor. The logic is usually located in the center of the base. It has been shown that the smallest temperature changes occur in this area with a temperature increase in the area of the journals. Thus, the logic is arranged in a relatively cool area of the journal cross.

According to a preferred further configuration of the present invention, each of the sensor elements is connected data-wise to the logic via a data line. Preferably, the corresponding data line is guided through the material forming the base in a sealed manner. The data line extends from the lubricant channel inside the base to the outside of the journal cross. The data line is usually guided for each of the sensor elements to the point of intersection of the opposite journals, where the logic is located.

The logic is preferably a logic that includes a memory. This memory can store the measuring signals of the individual sensor elements over time and thus make the temperature curve retrievable. However, the logic also preferably has an evaluation unit which evaluates the signals of the sensor element and generates an output signal which indicates a fault state. With a particularly simple configuration, the logic is prepared in such a way that it does not store the signals of the sensor element, but only the output signal. This output signal can be a binary value that indicates either a state of a fault or a state without fault as a fault state. For example, the memory can be excited and read out from outside. In a simple configuration, the logic and the memory are configured such that external excitation merely informs a receiving unit whether a critical fault state has occurred or not. This information can also be transmitted, for example, by a diode which is directly mounted on the logic and is activated, for example, by an external request. For example, in the case of an external request, the diode can be switched such that it outputs a fault or no fault as a fault state.

According to a preferred further configuration of the present invention, at least one sensor element is assigned to each of the journals. This configuration offers the possibility to compare the measuring signals of the individual sensor elements, in particular, if the sensor elements are connected data-wise to the logic via data lines.

The logic preferably indicates a fault state if the signal of at least one of the sensor elements exceeds a tolerance value. Specifically, in this configuration, a certain temperature difference can be specified as a tolerance value. The calculation of an average temperature value based on the sensor signals has the advantage that the evaluation of a fault state is carried out independently of the actual outside temperature. The temperature difference alone compared to this average value due to increased friction and thus wear on a journal is evaluated as an indication of a fault state. Using this further configuration, the journal cross can be easily and with little effort monitored during operation to determine whether excessive wear occurs on at least one of the journals. Merely such a finding must be output or displayed via the logic.

The logic does not necessarily have to be arranged on the base of the journal cross. Rather, the evaluation unit can also be accommodated at another location, for example in the shaft body of a drive shaft which is connected to at least one journal cross according to the invention.

The logic can also be mounted on a printed circuit board 30, which carries and connects at least one sensor element provided on-board, which determines the temperature of the journal cross. Thus, the logic and at least one of the sensor elements are preferably mounted on a common printed circuit board 30. A sensor element mounted in such a way can, for example, be provided on the outside of the base in the area of the intersection of the central longitudinal axes of the journals. The sensor can, for example, be fully or partially inserted in a central lubricant channel. With an on-board mounted sensor element, the cabling for the data line can be dispensed with.

According to a preferred further configuration, a protective cover is provided which is associated with or covers the logic and/or the temperature sensor on the outside so that the drive shaft outside lubricating lubricant and/or moisture and dirt do not reach the electronic components of the journal cross according to the invention. The protective cover may be formed by a foil or at least a shell element which is regularly made of plastic. The protective cover may also be formed by two shell elements sealingly enclosing the base between them.

BRIEF DESCRIPTION OF THE DRAWINGS

The present invention is explained in more detail below on the basis of embodiments in conjunction with the drawings. Therein.

DETAILED DESCRIPTION OF THE INVENTION

Figure 1:
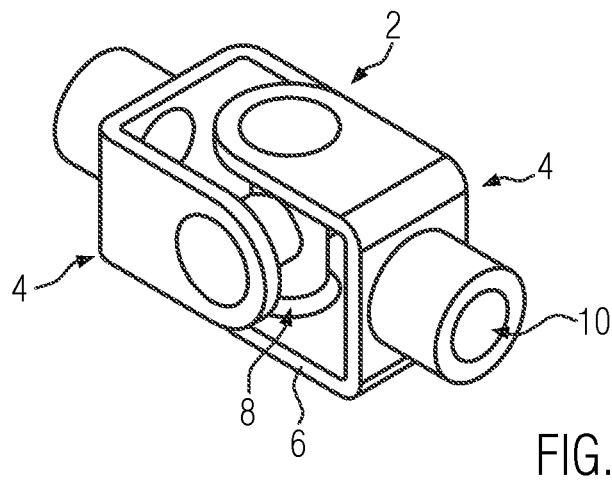
FIG. 1: shows a perspective side view of a first embodiment of a universal joint.

FIG. 1 shows an example of a universal joint 2 with two fork-shaped yokes 4, each of which is pivotally mounted on opposite journals 6 of a journal cross 8. The fork-shaped yokes 4 comprise receptacles 10 for the torque-proof accommodation of a non-shown shaft body.

Figure 2:
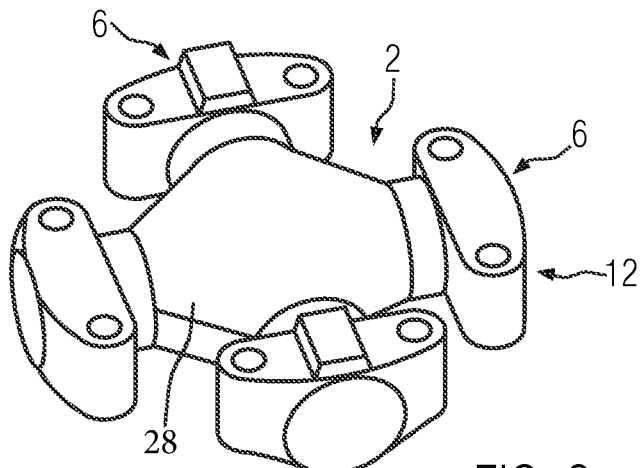
FIG. 2: shows a perspective top view of a second design embodiment of a universal joint.

FIG. 2 shows an alternative example of a universal joint 2 with a journal cross 8, the journal 6 of which each is accommodated in journal receptacles 12, which can be mounted on the drive or output side via non-shown fastening screws. Compared to the embodiment shown in FIG. 1, the embodiment shown in FIG. 2 has a smaller axial structure. Both embodiments can, however, realize the invention explained below with reference to FIG. 3.

Figure 3:
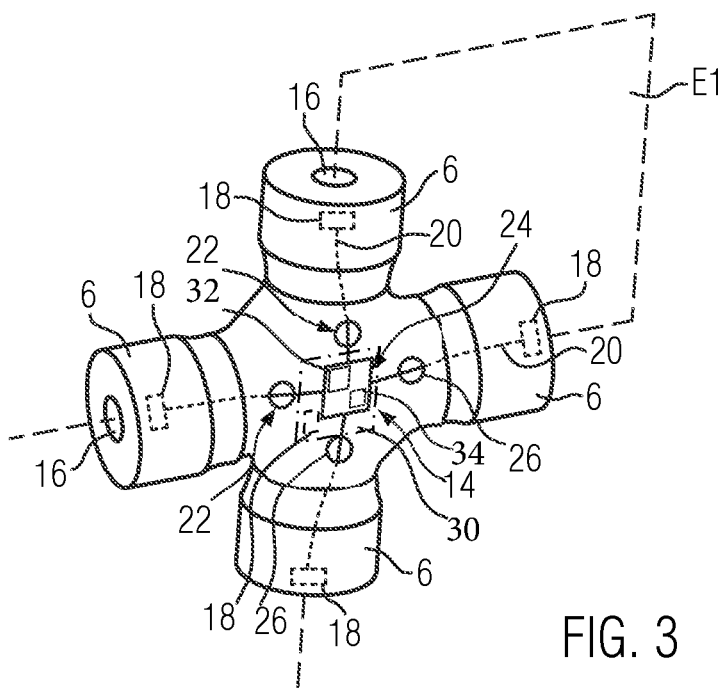
FIG. 3: shows a perspective side view of a journal cross, which can be used in the universal joints according to FIG. 1 or 2.

FIG. 3 shows an embodiment of a journal cross 8 with four journals 6 defining a plane E1 containing the central longitudinal axes of the journals 6. The journals 6 project from a middle base 14 and are realized with base 14 in a uniform forged component. The surface of base 14 is essentially unfinished. The circumferential surface of the journals 6 is turned down on a lathe to accommodate bearings.

As shown in FIG. 3, the base 14 is penetrated by intersecting lubricant channels 16. Inside the machined journals 6, i.e. circumferentially surrounded by the machined mounting surface of the journal 6, there is a sensor element 18 that is not shown in detail, for detecting the temperature of the base 14 at this point. The sensor element 18 is usually arranged in the lubricant channel 16 by gluing the sensor element 18 against the inner circumferential surface of the lubricant channel 16. A data line 20 connected to the sensor element 18 is guided from the inside of the base 14 to the outside through a bore identified by reference sign 22 and is connected data-wise to a logic 24 in the form of an equipped circuit board 30 which is applied, for example glued, to the outside of the base 14 in the center of the base 14. After mounting the data line 20 in the manner described above, the bore 22 is sealed with a hardening compound which is inserted into the bore 22 and identified with reference sign 26 in FIG. 3.

The sensor elements 18 provided for each of the journals 6 are each coupled data-wise with the logic 24 in the manner described above. Thus, the logic 24 evaluates the measuring signals of each individual sensor element 18. The logic may have a memory 32 and an evaluation unit 34.

REFERENCE SIGN LIST 2 universal joint
4 fork-shaped yoke
6 journal
8 journal cross
10 receptacle
12 journal receptacle
14 base
16 lubricant channel
18 sensor element
20 data line
22 bore
24 logic
26 hardening compound E1 plane containing the central longitudinal axes of the journals 6

The invention claimed is:

1. A journal cross of a universal joint with four journals projecting from a base, comprising:
   at least one temperature sensor fastened to the journal cross, wherein the temperature sensor comprises at least one sensor element which is arranged in a lubricant channel that is recessed in the journal cross and is assigned to one of the journals,
   a logic is mounted on the journal cross for processing the signals of the at least one temperature sensor, wherein the logic is coupled data-wise with several sensor elements detecting the temperature, and
   wherein the sensor elements are connected data-wise via data lines to the logic, which are guided through the material forming the base in a sealed manner from the lubricant channel to the outside of the journal cross.

2. The journal cross according to claim 1, wherein the logic has a memory and an evaluation unit which evaluates signals from the sensor elements and generates an output signal which indicates a fault state.

3. The journal cross according to claim 1, wherein at least one sensor element is assigned to each of the journals and the logic indicates a fault state if the signal of at least one sensor element exceeds a temperature threshold value.

4. The journal cross according to claim 1, wherein the logic and at least one sensor element are mounted on a common printed circuit board.

5. The journal cross according to claim 1, wherein a protective cover is associated with the logic and/or at least one of the sensor elements.

6. A universal joint, comprising two fork-shaped yokes which are each mounted pivotally on opposite journals of a journal cross according to one of claim 1.

* * * * *

UNITED STATES PATENT AND TRADEMARK OFFICE
CERTIFICATE OF CORRECTION

| | |
|---|---|
| PATENT NO. | : 11,578,762 B2 |
| APPLICATION NO. | : 16/788614 |
| DATED | : February 14, 2023 |
| INVENTOR(S) | : Timur Mehmet Kisla et al. |

It is certified that error appears in the above-identified patent and that said Letters Patent is hereby corrected as shown below:

In the Claims

Column 6, Line 17, Claim 6, after "to" delete "one of"

Signed and Sealed this
Twenty-fifth Day of April, 2023

Katherine Kelly Vidal
*Director of the United States Patent and Trademark Office*